March 27, 1951 C. H. PRESCOTT, JR 2,546,700
MULTIPLE CHISEL STRUCTURE FOR DISINTEGRATING AND REMOVING
INCRUSTATIONS FROM INTERIOR WALLS OF RECEPTACLES
Original Filed Sept. 2, 1944 2 Sheets-Sheet 1
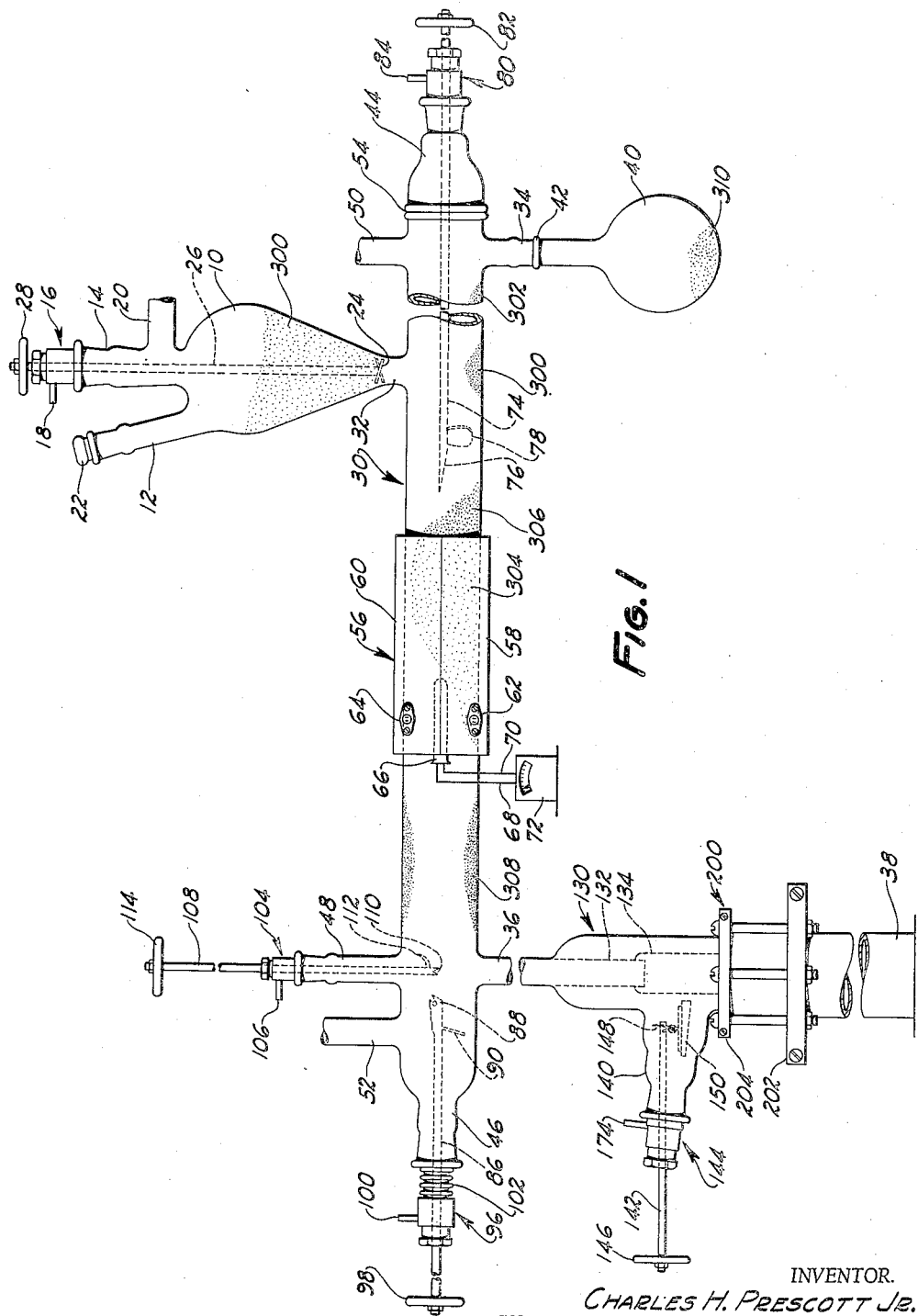
INVENTOR.
CHARLES H. PRESCOTT JR.
BY
ATTORNEY.

March 27, 1951 C. H. PRESCOTT, JR 2,546,700
MULTIPLE CHISEL STRUCTURE FOR DISINTEGRATING AND REMOVING
INCRUSTATIONS FROM INTERIOR WALLS OF RECEPTACLES
Original Filed Sept. 2, 1944  2 Sheets-Sheet 2
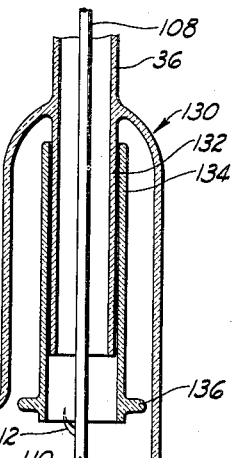
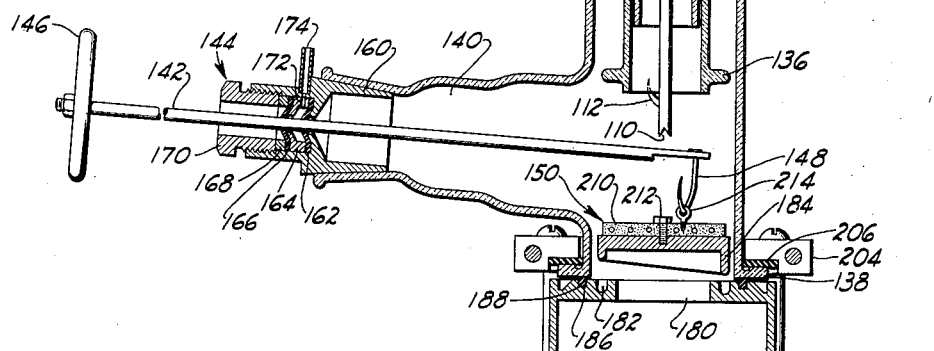
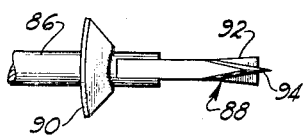
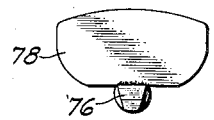
INVENTOR.
CHARLES H. PRESCOTT, JR.
BY
ATTORNEY.

Patented Mar. 27, 1951

2,546,700

UNITED STATES PATENT OFFICE 2,546,700

MULTIPLE CHISEL STRUCTURE FOR DISINTEGRATING AND REMOVING INCRUSTATIONS FROM INTERIOR WALLS OF RECEPTACLES

Charles H. Prescott, Jr., Berkeley, Calif., assignor to the United States of America as represented by the United States Atomic Energy Commission Original application September 2, 1944, Serial No. 552,556. Divided and this application November 2, 1945, Serial No. 626,388

4 Claims. (Cl. 15—104.16)

This invention relates to apparatus for use in connection with packaging and/or closing, in the absence of air, receptacles containing material that is rapidly decomposed or otherwise affected deleteriously when exposed to atmospheric conditions. More particularly, it appertains to certain implements useful in connection with vacuum apparatus adapted for the purification of chemical compounds such as uranium chlorides that must be handled in the absence, or substantial absence, of air. This application is a division of my prior copending application Serial No. 552,556, filed September 2, 1944, and contains claims directed to certain adjuvant apparatus elements that have proved to be particularly useful in conjunction with the method and apparatus forming the subject matter of the prior application.

The invention has for an object the provision of adjuvant apparatus elements useful in connection with the vacuum packaging of a hygroscopic material such as hygroscopic uranium compounds. Other objects are to provide certain apparatus elements useful in conjunction with apparatus for purifying and packaging uranium compounds under vacuum conditions, and to seal hermetically vacuum containers charged with uranium compounds. Additional objects are to provide certain apparatus elements useful in conjunction with apparatus adapted to isolate a uranium chloride in a vacuum, to sublime a uranium chloride in a vacuum, to purify a uranium chloride in a vacuum, and to store a uranium chloride in a vacuum. A general advance in the art and other objects that will appear hereinafter are also contemplated.

In accordance with this invention, an apparatus has been originated for packaging a volatile, hygroscopic compound, such as a volatile, hygroscopic uranium compound, comprising subliming a hygroscopic uranium compound, condensing the sublimed compound, charging a container with the sublimed compound, and hermetically sealing the container, all of the operations being conducted without exposing the hygroscopic uranium compound to the atmosphere. Uranium compounds that are suitable for treatment in this manner are uranium hexachloride, uranium tetrachloride, and the like.

An apparatus suitable for purifying and packaging the hygroscopic uranium compound comprises a subliming chamber, a condensing chamber joined thereto, a storage receptacle and a conduit connecting the condensing chamber and storage receptacle, means for maintaining a vacuum in the apparatus, means for heating the subliming chamber whereby the uranium compound is sublimed into the condensing chamber where it is condensed, means for moving the sublimed and condensed uranium compound into the conduit and the storage receptacle, and means for hermetically sealing the charged storage receptacle. The present application is concerned more particularly with certain adjuvant apparatus elements that have been found to be particularly well adapted for assisting in maintaining the proper movement of solid material, comprising the uranium or other compound, through the apparatus, and particularly through the subliming and/or condensing chamber.

It has been found that under the thermal conditions obtaining in the subliming and/or condensing chambers, the uranium or other compound forming the charge material and/or the uranium or other compound forming the sublimed and purified product frequently tends to adhere tightly to the wall of the subliming and/or condensing chambers. Moreover, the uranium or other compound, particularly that comprising the purified product, is sometimes present in the apparatus in the form of lumps or granules and/or conglomerated masses that require to be broken up if the broad objects of the apparatus are to be attained in the most preferred manner. Furthermore, it appears that the charge material itself that is introduced into the subliming chamber sometimes tends to conglomerate, due to the thermal conditions obtaining within the subliming chamber and/or possibly in some cases due in part to a slight residual moisture content in the charge material.

Accordingly, certain adjuvant apparatus elements have been fabricated particularly with a view toward the more efficient handling of the material undergoing processing in the subliming and/or condensing chamber of the receptacle charging apparatus forming the subject matter of the above-mentioned copending application Serial No. 552,556. As will appear more fully hereinafter, these adjuvant apparatus elements are materials-handling elements so arranged and employed in connection with the apparatus that they are operable from outside the apparatus through appropriate Wilson seals, thereby permitting them to be operated at will from without the apparatus at the convenience of the operator, without at the same time making it necessary to break the relatively high vacuum that is maintained in the interior of the apparatus.

How the foregoing objects and related ends are accomplished will be apparent from the following description including the principle, the organization and various embodiments of the invention, and the best mode contemplated for carrying out the same. This description is amplified by the accompanying drawings, in which:

Figure 1 is a fragmentary side view, in elevation, of the combined charge purifying and receptacle filling and sealing apparatus embodying the features of the invention.

Fig. 2 is a fragmentary view, in plan, of the end of the material moving device employed in the condensing end of the apparatus of Fig. 1.

Fig. 3 is a side view, in elevation, of the device of Fig. 2.

Fig. 4 is an end view, in elevation, of the device of Fig. 2.

Fig. 5 is a fragmentary view, in plan, of the end of the material moving device employed in the feeder end of the apparatus of Fig. 1.

Fig. 6 is a side view, in elevation, of the device of Fig. 5.

Fig. 7 is an end view, in elevation, of the device of Fig. 5.

Fig. 8 is an enlarged fragmentary view, partly in section, of a portion of the apparatus of Fig. 1, illustrating the closing hood and a storage receptacle secured thereto, as well as a typical Wilson seal arrangement by which the material moving devices may be manipulated from without the apparatus without at the same time breaking the vacuum existing within.

Referring now to Figs. 1 to 8 of the drawings, there is illustrated a purifying and packaging apparatus constructed largely of glass and comprising a hopper 10 in which the material to be processed is placed before the purification operation is started. A hopper having a capacity of about one liter is suitable. This hopper has a conduit 12 through which it is filled with raw material, a tubular extension 14 designed to receive a conventional Wilson seal 16 having a vacuum testing connection tube 18, and a duct 20 for connection to a vacuum-producing apparatus (not shown). A removable plug 22 fitting tightly in the conduit 12 seals this part of the apparatus against the atmosphere.

Raw material is released from the hopper 10 as desired by means of a feeding device comprising a stainless steel disk-like gate 24. This gate, comprising two slightly warped semicircular metal sheets, is carried on a rod 26 that extends through the Wilson seal 16 and is operated by a handwheel 28. A cylindrical rod made of one-quarter inch stainless or ordinary carbon steel stock is suitable. Rotation of the handwheel 28 produces rotation of the gate 24 which thereupon functions like a feed screw to release material from the hopper in a conventional manner.

The hopper 10 is connected to a subliming container or kiln 30 by means of a duct 32, through which the raw material is delivered by gravity when released by the gate 24. Ordinarily, the container 30 is a 2.25 inch diameter Pyrex glass cylinder about 50 inches long. The container 30 has two downwardly extending delivery ducts or tubes 34 and 36. The sublimed and purified material is transmitted to a storage receptacle 38 through the tube 36, and unsublimed material is moved through the tube 34 to a receptacle 40 connected thereto at 42. The container 30 also has tubular extensions 44, 46 and 48 constituting portals for the devices that manipulate materials being processed, as well as two ducts 50 and 52, located exteriorly of the path of material as it is processed, for connections to apparatus capable of producing a vacuum of at least $10^{-4}$ mm. Hg. A gastight joint 54 is provided to facilitate assembling and cleaning the apparatus.

Near its center the horizontally disposed container 30 has a subliming zone surrounded by a furnace 56. This furnace consists of two semicylindrical electrical resistance heaters 58 and 60, capable of raising the mass of material being processed to its volatilization and/or decomposition temperature. The temperature commonly employed in subliming uranium hexachloride in this apparatus is about 150° to 180° C., or even as high as 210° C. The heaters have individual electrical connections 62 and 64 for a source of heating current. The heater sections are constructed to provide space for a thermocouple well 66. The thermocouple therein (not shown) is connected by conductors 68 and 70 to an indicating and/or recording instrument 72, such as a potentiometer or voltmeter, which may be suitably calibrated to indicate and/or record directly in terms of the temperature prevailing within the subliming zone.

For moving material inside the vessel 30 at the feeder end thereof, an implement comprising a rod 74 carrying a chisel 76 and a hoe 78 is provided. To insure adequate rigidity, this rod should be about one-quarter inch in diameter. The rod 74 extends through a conventional Wilson seal 80 in the tubular extension 44, and carries on its external end a handwheel 82 by which the implement is manipulated. The chisel 76 and hoe 78 are ordinarily made of stainless steel. The hoe is preferably in the form of an approximately 120° helical sector, tilted at an angle of about 22.5° to a plane normal to the axis of the rod, so that by rotating the rod 74 the hoe can be screwed into the mass of granular material in the chamber without pushing the entire mass of material forward, thus breaking up lumps or aggregates of the material.

For testing the gastightness of the connection around the rod 74, the Wilson seal 80 has, as is usual with these devices, a lateral tube 84 for connection to vacuum-producing apparatus.

At the delivery end of the container 30, in the tubular extension 46, there is another material manipulating arrangement comprising a rod 86 carrying a chisel 88 and a scraper blade 90, a surface of which is substantially normal to the axis of the rod. As clearly shown in Figs. 1 to 4, the chisel portion 88 comprises one chisel surface 92 adapted to contact more or less closely the wall surface of the chamber 30 in order to scrape sublimate therefrom, and a second chisel surface 94 extending ahead of, and substantially at right angles to, the first-mentioned chisel surface 92, thereby functioning to split portions of the sublimate away from the main bulk thereof before the first-mentioned chisel surface 92 can develop a wedge action upon the main mass of sublimate when the tool is driven in a direction generally parallel to the wall surface. It will also be noted that the second-mentioned chisel surface 94 slopes with respect to the axis of the rod, forming a relatively sharp trihedral angle at the outermost point, which point (as shown in Fig. 3) lies somewhat below the plane of the first-mentioned chisel surface 92, the whole thereby forming an extremely effective chisel.

The rod 86 extends through an improved Wilson seal 96 and carries, exteriorly of the container 30, a handwheel 98 by which it is manipulated. This rod is also preferably of one-quarter inch round stock. The diaphragm case or holder of the Wilson seal carries the customary vacuum connection tube 100.

The improved Wilson seal 96 preferably employed in conjunction with rod 86 is of a new design, being specially constructed to allow more than the usual (12°) deflection for the rod 86, as is customary in the conventional Wilson seal, such as seal 80. This improved Wilson seal is fully described in U. S. Patent 2,442,622 to Starr, issued June 1, 1948. For specific details of this improved Wilson seal reference may be had to the aforementioned Starr patent, it being sufficient for present purposes to note in passing that the greater range in movement afforded by this seal is obtained by an arrangement including a swivel joint. This joint, located between the case carrying the diaphragms (not shown) and the plug fitting into the extension 46, is covered by a conventional flexible thin metal bellows 102. This bellows is soldered to the aforementioned parts to permit maintaining the high vacuum inside the apparatus.

The tubular extension 48 extending upwardly from the container 30 carries a conventional Wilson seal 104, incorporating a vacuum testing connection tube 106. A rod 108, which extends through the Wilson seal 104, has a pointed and/or notched end 110 and carries adjacent thereto a small hook 112 pointing in substantially the opposite direction. This rod is conveniently made from one-eighth inch round stock. A handwheel 114 at the external end of the rod 108 is utilized for imparting movement thereto.

Referring now to Fig. 8, the duct 36 projects into a hood 130 and terminates in a nozzle 132 which is surrounded by a telescoping spout 134. During the time the storage receptacle 38 in being filled, this spout projects into the mouth of the receptacle and is supported on the top of the receptacle by an integral, laterally projecting flange 136. This arrangement forms a continuous passage, whereby material falling through the duct 36 is conducted into the interior of the receptacle, thereby avoiding an accumulation of material in fine particle or dust form on the top of the receptacle adjacent the closure, which accumulation of material would interfere with sealing the closure.

The hood 130 comprises a flange 138 conforming to the top of the receptacle 38 and a laterally extending tubular portion 140 that forms the housing for a rod 142 that is supported within a conventional Wilson seal 144. This rod, preferably of one-quarter inch round stock, is manipulated by a handwheel 146 and carries on its inner end a hook 148 which, during the receptacle filling operation, supports a cap 150 for the receptacle 38 in a position within the lateral extension 140 where the cap cannot interfere with the descent of material into the storage receptacle (Fig. 1 position). The hook 112 on the rod 108 supports the telescopic spout 134 above the mouth of the receptacle 38 during the receptacle capping operation (Fig. 8 position).

The conventional Wilson seal 144 that closes the tubular extension 140 is typical of the conventional Wilson seals that have been referred to hereinbefore, and consequently will be described in some detail for the sake of completeness. This seal comprises a plug portion 160 having a seat upon which a rubber diaphragm 162 is supported. A circular and annular spacer 164 engages the diaphragm 162 and, in turn, is engaged by a second rubber diaphragm 166. This assembly is maintained in position by a washer 168 and a screw plug 170. A vent 172 in the annular portion of the spacer 164 connects the space between the rubber diaphragms 162 and 166 to a tube 174. This tube 174 is employed as a vacuum connection for testing the adequacy of the seal made between the rod 142 and the two cooperating diaphragms 162 and 166. By evacuating the tube 174, it is possible to determine before the processing of material is started whether or not a gastight seal between the rod 142 and the plug 160 is formed by either or both of the diaphragms 162 and 166.

The receptacle 38 is cylindrical in shape and has a circular mouth 180 in the top. Surrounding the mouth is a groove 182 designed to receive the depending skirt or flange 184 of the cap 150, and a groove 186 for packing purposes. Ordinarily, the mouth 180 and grooves 182 and 186 are located concentrically in the top of the receptacle. An annular gasket 188, preferably made of rubber, is positioned in the groove 186 in order to produce a vacuum-tight seal between the receptacle 38 and the hood 130. Preferably, the receptacle 38 is made of stainless steel, for example, 18–8 (18–Cr, 8–Ni; U. S. S. #316) stock, but other metals not readily attacked by the vapors of uranium halides may be used if desired.

The receptacle 38 is secured to the hood 130 while being filled and closed by a cage-like frame 200. This frame comprises a split ring that grips the receptacle 38 and a split collar that extends over the flange 138 on the hood 130. The split ring is indicated by the reference numeral 202 and the split collar by the reference numeral 204. The split ring is held in gripping engagement with the receptacle 38 in a manner that will be apparent upon inspection of Figs. 1 and 8, and is in turn secured to the split collar 204 that supports the entire assembly in gastight relation against the flange 138 of the hood 130 in a manner that likewise will be apparent upon inspection of these figures. A flat ring 206, preferably made of rubber, serves as a cushion between the split collar 204 of the frame 200 and the frangible flange 138 of the hood 130. Further specific details of this assembly are not pertinent to the present claimed invention, but may be obtained by consulting the above-mentioned prior copending application Serial No. 552,556.

The cap 150 that is adapted to be soldered into sealing engagement over the mouth of the receptacle 38 constitutes an arrangement that is fully described in the copending application of Duane C. Sewell, Serial No. 554,926, filed September 20, 1944, while the method of completing the appropriate seal between the two is fully described in the above-mentioned prior copending application Serial No. 552,556. Since this subject matter forms no part of the present claimed invention, it is deemed unnecessary to describe it in detail at this point, it being sufficient to note in passing that the cap 150 removably supports an electric heater 210, the heater 210 being secured in place by an arrangement including a screw 212 threaded into the cap 150. The heater includes an electric resistance element, one terminal of which is grounded to the cap 150 and the other terminal of which is connected to a terminal post 214 in the form of a loop or eyelet. The circuit for the heater element may be completed (in a manner not shown) by setting the notched end 110 of the rod 108 against the loop 214, and by connecting the rod 108 and the receptacle 38 to a suitable current source by a circuit having a suitable switch (not shown) for making and breaking the heater circuit.

Considering now the mode of operation of the apparatus shown in Figs. 1 to 8, the hopper 10 is filled with a mass of raw or crude hygroscopic material 300 (such as uranium hexachloride) in subdivided form through the conduit 12, and the plug 22 is fitted into the end of the conduit 12 in gastight relation. A quantity of glass or other relatively inert material 302, in the form of powder or small beads, is placed in the container 30 in a position from which it can be later advanced toward the subliming zone for a purpose to be noted more fully hereinafter; a previously prepared receptacle cap 150 is suspended upon the hook 148 carried by the rod 142 in the tubular extension 140; a previously prepared storage receptacle 38 is secured and sealed to the hood 130 by the frame 200, the telescopic spout 134 being adjusted in the mouth 180 of the storage receptacle 38; the receptacle 40 is secured to the tube 34; and the joints 42 and 54 are closed. Preferably, the joints 42 and 54, as well as the connections between the conduit 12 and the plug 22 are sealed in a gastight manner with ordinary sealing wax. Similarly, the connection between the tubular extension 14 and the Wilson seal 16, the connection between the tubular extension 44 and the Wilson seal 80, the connection between the tubular extension 46 and the Wilson seal 96, the connection between the tubular extension 48 and the Wilson seal 104, and the connection between the tubular extension 140 and the Wilson seal 144 are also sealed with sealing wax. The vacuum-testing tubes 18, 84, 100, 106 and 174, respectively associated with the Wilson seals 16, 80, 96, 104 and 144 are suitably connected to the vacuum-producing apparatus and the several Wilson seals are tested in order to insure that the apparatus as a whole is gastight. The ducts 20, 50 and 52 are then connected to the vacuum-producing apparatus, whereby the container 30 and the connected parts are evacuated to a relatively low pressure, such for example as $10^{-4}$ mm. Hg.

A portion of the crude uranium hexachloride 300 is introduced into the container 30 by suitably rotating or reciprocating the handwheel 28 in order to control the gate 24, and is positioned in the heating zone within the furnace, as shown at 304, by means of the hoe 78. Thereafter the subdivided glass or other relatively inert material 302 is spread over the adjacent or feed side of the pile of crude uranium hexachloride, as shown at 306, thereby preventing or substantially preventing the flow of vapors toward the feed side of the apparatus. Heat is then applied, causing volatilization of the uranium hexachloride, the vapor of which flows toward the cooler portion of the container 30 and condenses thereon, as shown at 308. Accordingly, it will be noted that the portion of the container lying between the heater 56 and the duct 46 functions as an air-cooled condenser; it may be additionally noted that, when and if desired, supplemental cooling structure, such as a surrounding coil (not shown) through which is circulated a cooling medium such as water, may be provided at this point.

The condensate of uranium hexachloride usually begins to appear when the charge has reached a temperature of approximately 80° C. However, temperatures somewhat in excess of 150° C., for example in the range of approximately 150° to 190° C., are preferred for the sublimation of this material at a practicable rate. The sublimation of the UCl$_6$ may be carried to substantial completion by raising the temperature to about 210° C. for a short time (up to about thirty minutes) at the end of a run at the lower temperature mentioned. The use of the higher temperature for extended periods is ordinarily not desired because uranium hexachloride begins to decompose slightly at 100° C., and at an appreciable rate above 150° C. in vacuo.

The layer of glass 306 serves to retard or prevent the flow of volatilized uranium compound in the opposite direction. When the vaporization of the charge has been completed, the glass and residual matter from the charge is raked back and into the receptacle 40 as shown at 310, except for a portion which preferably is retained in the tube 30 between ducts 32 and 34 to serve as a vapor blocking layer for the succeeding mass of crude material to be processed. Another portion of the crude material 300 is then admitted to the tube 30 from the hopper 10 and is positioned in the heating zone at 304, after which it is covered with a layer 306 of subdivided glass and nonvaporized material from a previous run or runs, and another vaporization cycle is conducted. These cycles are then repeated without breaking vacuum until the supply of crude uranium hexachloride 300 has been exhausted.

The condensed uranium hexachloride 308 that collects on the cooler portions of the wall of the container 30 is chiseled away, preferably after each sublimation, with the chisel 88 and raked into the duct 36 with the hoe 90. The sublimate is deposited on the inside of the tube 30 in a zone ordinarily extending from about one-half inch to twelve inches from the edge of the hot zone, with the thickest deposit usually occurring in the first three inches. The uranium hexachloride that sublimes below 170° C. condenses in this three-inch zone in a layer usually about ⅜-inch thick. This deposit has a mechanical strength approximately equal to that of anthracite coal and hence must be chiseled off the wall. However, the adhesion between the deposit and the glass is somewhat weaker than its internal strength or cohesion, so that the deposit tends to scale or break off in large pieces, particularly when the wall surface of the container 30 is clean.

For this reason it will be apparent that the chisel 88 comprising the forward cutting edge 94, tending to break off the deposit in the form of smaller pieces before large pieces scale off the container wall, is of particular advantage in handling material of this character. Pieces too large to pass through the duct 36 may be chopped into smaller pieces by means of the pointed end 110 of the rod 108.

Although by this method all of the sublimed and purified uranium hexachloride may not be completely removed from the wall of the container 30, and although some slight amount of uranium hexachloride vapor may have seeped through the barrier layer 306 and deposited in solid form in the feed end of the tube 30, it is unnecessary to clean the tube after each run since dry air (which may be introduced into the apparatus when fresh feed material is introduced into the hopper 10 and which might remain in extremely small amount in the apparatus) causes no visible decomposition of the uranium hexachloride. It is therefore customary practice to clean the entire apparatus only after a number of runs.

A single run of the type described above usually requires a full working day and produces approximately one-half kilogram of highly purified uranium hexachloride, these figures being exemplary and based upon the particular apparatus chosen by way of illustration.

Instead of treating an impure uranium hexachloride to obtain the desired highly purified uranium hexachloride product as described above, uranium pentachloride may be employed as the starting material for the production of uranium hexachloride by the reaction mechanism disclosed in the copending application of Francis A. Jenkins, Serial No. 494,447, filed July 13, 1943; i. e., by the disproportionation of uranium pentachloride into uranium hexachloride and uranium tetrachloride under the influence of heat. When uranium pentachloride is used as the starting material 300, it is heated in the subliming zone to a temperature ranging from about 80° to about 180° C. but preferably toward the upper end of this range. Temperature as high as 250° C. may be employed for short periods, so as not to cause undue decomposition of the produced uranium hexachloride. At such temperatures, and under high vacuum, the uranium pentachloride is decomposed into uranium tetrachloride and uranium hexachloride, the latter passing out of the heated zone in the form of vapor which is condensed in the cooler portion of the container 30 from which it is removed and loaded into the storage receptacle 38, as more fully described above. A residue, mainly uranium tetrachloride, of over 50 per cent of the original material is left in the sublimation zone. As this residue accumulates in the sublimation zone during and as a result of the disproportionation of successive charges of uranium pentachloride and the attendant vaporization of uranium hexachloride produced thereby, the undesired accumulation of residue is raked into the duct 34 and collected in the receiver 40 at desired intervals for suitable salvage operations, preferably however retaining each time sufficient of hte residue in the container 30 to serve as a blocking layer 306 for the succeeding charge of uranium pentachloride that is positioned in the subliming zone at 304.

Uranium tetrachloride of more or less impure form may also be used as the starting material 300 where it is desired to prepare and/or package this compound in a highly purified form for subsequent use. In this case the operation of the apparatus is generally similar to that already described for the case of uranium hexachloride, except that considerably higher temperatures, such as 512° to 520° C., are preferably employed for subliming the uranium tetrachloride since this compound is considerably less volatile than uranium hexachloride. In general, a temperature of at least 500° C. is preferably employed. Condensation of purified uranium tetrachloride in the cooler portions of the tube 30 is ordinarily first observed at a temperature of about 365° to 380° C., under the pressure conditions already set forth. However, temperatures of from approximately 500° to 550° C. or higher are required for the sublimation of this material at a practicable rate. When these higher temperatures are employed it may be desirable to employ additional support for the tube 30 to prevent any sagging of the tube due to the higher temperatures necessary for the sublimation of uranium tetrachloride at practicable rates.

It will be understood that when a sufficient quantity of sublimate of highly purified uranium hexachloride (or of highly purified uranium tetrachloride, when the starting material 300 comprises more or less impure uranium tetrachloride as described in the preceding paragraph) has been deposited on the walls of the container 30 as shown at 308, the deposit is removed from the walls, broken into sufficiently small particles to pass through duct 36, and scraped into the duct by suitable manipulation through the corresponding seals of rod 86 carrying scraper 90 and chisel 88 and rod 108 having the pointed end 110. In this manner sufficient purified sublimate is collected to fill the storage receptacle 38 to the desired level. Where two or more sublimation cycles are required to obtain the desired quantity of sublimate, care is taken to maintain the vacuum in the system between successive cycles, as previously mentioned.

Having collected the desired quantity of purified sublimate in the storage receptacle 38, the rod 108 is manipulated so that hook 112 lifts the telescopic spout 134 from the filling position shown in Fig. 1 to the capping position shown in Fig. 8, the rod 142 with its hook 148 carrying the cover 150 is manipulated to move the cover from its retracted filling position shown in Fig. 1 to the position shown in Fig. 8, and the cover is thereupon placed in capping position with its skirt 184 disposed in groove 182 of the receptacle 38. (It will be understood that the groove 182 in the top of the storage receptacle 38 and the skirt 184 of the cap 150 will have been prepared previously for the soldering operation, in the manner fully described in the prior copending application Serial No. 552,556). Rod 142 is then manipulated so that its hook 148 supports the telescoping spout 134, thereby freeing rod 108 with its pointed end 110 for another purpose, namely, that of completing the electric circuit to the receptacle cap heater 210. For this purpose the rod 108 is manipulated so that its notched end 110 bears firmly upon the eyelet 214 that forms a terminal post for the resistance element of the heater 210 that is attached to the cover 150. Upon completing the electrical circuit including the heater 210, the latter is energized and thereby supplies sufficient heat to the cap 150 to melt a mass of solder, such as Wood's metal, that is employed to hermetically seal the cap 150 to the receptacle 38. The circuit is then opened and, after cooling, the Wood's metal forms a hermetic seal between the skirt 184 of the cover 150 and the top of the storage receptacle 38. The frame 200 by which the receptacle 38 is clamped against the flange 138 of the hood 130 may then be unfastened, and the storage receptacle 38 with its hermetically sealed contents removed from the apparatus. Another receptacle cover or cap 150 and another storage receptacle 38 (previously prepared for the soldering operation) may then be placed in position in the apparatus, and the purifying and sealing operations resumed.

The vacuum-producing device associated with the purifying and packaging apparatus of Figs. 1 to 8 has not been shown in detail since it will be understood that it may be purely conventional in nature. Thus, this device preferably comprises two liquid air traps and a mercury diffusion pump. In addition, it is preferable to include drying tubes provided with magnesium perchlorate and phosphorus pentoxide to dry the stream of air entering the apparatus when it is let down to atmospheric pressure.

When processing corrosive materials such as are described herein, it is desirable—particularly in view of the relatively elevated temperatures employed—to use specially selected materials of construction for the apparatus. Because of its heat resistance, Pyrex glass is the preferred material for constructing the principal parts of the apparatus. The rods 26, 74, 86, 108 and 142, the hoes 78 and 90, the hooks 112 and 148, and the storage receptacle 38 are preferably made of stainless steel stock, such as 18–8 (Cr–18, Ni–8; U. S. S. #316), in order to resist corrosion by chlorine-containing materials inside the apparatus. The chisels or spikes 76 and 88 are made of tool steel. The receptacle cap 150 may be made of soft iron, and, since soft iron is not easily wet by molten Wood's metal (the material ordinarily used for soldering the cap to the storage receptacle), it is desirable that the skirt 184 on the cap 150 be coated or tinned with a metal that is readily wet by such an alloy, for example, a noble metal such as silver, gold, platinum, iridium or osmium. For like reasons, it is preferable also to coat the interior of the groove 182 with a layer of wetting metal, such as one of the noble metals just mentioned. The Wood's metal referred to above is a very low-melting material, usually the quaternary alloy 50 Bi, 25 Pb, 12.5 Sn and 12.5 Cd. This substance melts at 65.5° C. A silver solder comprising 63 Ag, 30 Cu and 7.5 Zn is especially suitable for tinning the skirt 184 on the cap 150.

While the foregoing apparatus has been described in connection with a process for treating certain named uranium compounds, it will be obvious that it is not limited to use with such materials. It will be especially obvious that the adjuvant apparatus elements to which the claims herein are particularly directed are of wide application, and that they will be found to be well adapted for processing other materials in vacuo where it is necessary to move the materials undergoing processing from without the apparatus, without at the same time disturbing the vacuum conditions within.

Probably many apparently widely different embodiments of this invention may be made without departing from the principle, breadth and spirit thereof and it is to be understood, therefore, that this invention is not limited to the specific embodiments thereof except as encompassed in the following claims.

What is claimed is:

1. An edged tool designed to remove from the wall of a processing chamber a material tenaciously adhering thereto comprising a rod carrying a first chisel adapted to rest upon the wall surface to scrape the material therefrom, the cutting edge of the first-mentioned chisel being substantially perpendicular to the axis of the rod, and a second chisel substantially at right angles to the first-mentioned chisel and projecting ahead thereof while sloping rearwardly therefrom, the cutting edge of the second-mentioned chisel sloping with respect to the axis of the rod, and forming a relatively sharp trihedral angle at the outermost point thereof, whereby portions of the material may be split away from the bulk thereof by the second-mentioned chisel before the first-mentioned chisel can develop a wedge action when the tool is driven in a direction generally parallel to the wall surface.

2. In combination with a processing chamber in which material is adapted to be processed substantially out of contact with the atmosphere, a seal in a wall of the processing chamber, and a rod extending through the seal in a substantially gastight manner, the end of the rod within the processing chamber constituting an edged tool designed to remove from the wall of the processing chamber a material tenaciously adhering thereto, the edged tool comprising a chisel adapted to rest upon the wall surface to scrape the material therefrom, and a second chisel substantially at right angles to the first-mentioned chisel and projecting ahead thereof while sloping rearwardly therefrom, whereby portions of the material may be split away from the bulk thereof before the first-mentioned chisel can develop a wedge action when the tool is driven in a direction generally parallel to the wall surface.

3. In combination with a seal adapted for location in a wall of a processing chamber in which material is adapted to be processed substantially out of contact with the atmosphere, an edged tool comprising a rod carrying a first chisel adapted to rest upon the wall surface to scrape the material therefrom, the cutting edge of the first-mentioned chisel being substantially perpendicular to the axis of the rod, and a second chisel substantially at right angles to the first-mentioned chisel and projecting ahead thereof while sloping rearwardly therefrom, the cutting edge of the second-mentioned chisel sloping with respect to the axis of the rod, and forming a relatively sharp trihedral angle at the outermost point thereof, whereby portions of the material may be split away from the bulk thereof by the second-mentioned chisel before the first-mentioned chisel can develop a wedge action when the tool is driven in a direction generally parallel to the wall surface.

4. For use in the removal from the wall of a processing chamber of material tenaciously adhering thereto, chisel means comprising an elongated rod mounted for rotatable and reciprocable movement in a stationary wall of the chamber and having a unitary chisel block rigidly affixed to one end of said rod, a first chisel surface on said block extending from one side thereof and terminating forwardly in a straight edge extending transversely of said rod, a pair of converging chisel surfaces extending from an opposite side of the block and intersecting to form a straight edge which projects from said opposite side diagonally across the axis of the rod and terminates in a sharp point in forwardly spaced relation to said transversely extending straight edge to provide an open space in said block intermediate said first surface and said converging surfaces, and a pair of forwardly converging surfaces defining a straight edge at the innermost portion of said space, whereby material first loosened by said second surface and later removed by said first surface may be passed through said open space during longitudinal movement of the chisel means.

CHARLES H. PRESCOTT, JR.

REFERENCES CITED

The following references are of record in the file of this patent:

UNITED STATES PATENTS

| Number | Name | Date |
|---|---|---|
| 267,306 | Gall | Nov. 7, 1882 |
| 343,769 | Levi | June 15, 1886 |
| 1,098,128 | Schlacht | May 26, 1914 |
| 1,347,649 | Mosher | July 27, 1920 |
| 1,419,886 | Muller | June 13, 1922 |
| 2,246,421 | Tate | June 17, 1941 |
| 2,322,419 | Cranford | June 22, 1943 |
| 2,354,245 | Corbosiero | July 25, 1944 |

FOREIGN PATENTS

| Number | Country | Date |
|---|---|---|
| 8,525 | Great Britain | of 1884 |